Aug. 21, 1962   F. H. OSBORNE ET AL   3,050,309
SELECTOR FOR AUTOMATIC PHONOGRAPHS
Filed Jan. 17, 1958   5 Sheets-Sheet 1

INVENTORS.
FRED H. OSBORNE.
ROBERT S. TUTTLE.
BY JOHN H. RIGGS.

Lockwood, Galt, Woodard & Smith.
ATTORNEYS.

Aug. 21, 1962  F. H. OSBORNE ET AL  3,050,309
SELECTOR FOR AUTOMATIC PHONOGRAPHS
Filed Jan. 17, 1958                                                   5 Sheets-Sheet 2
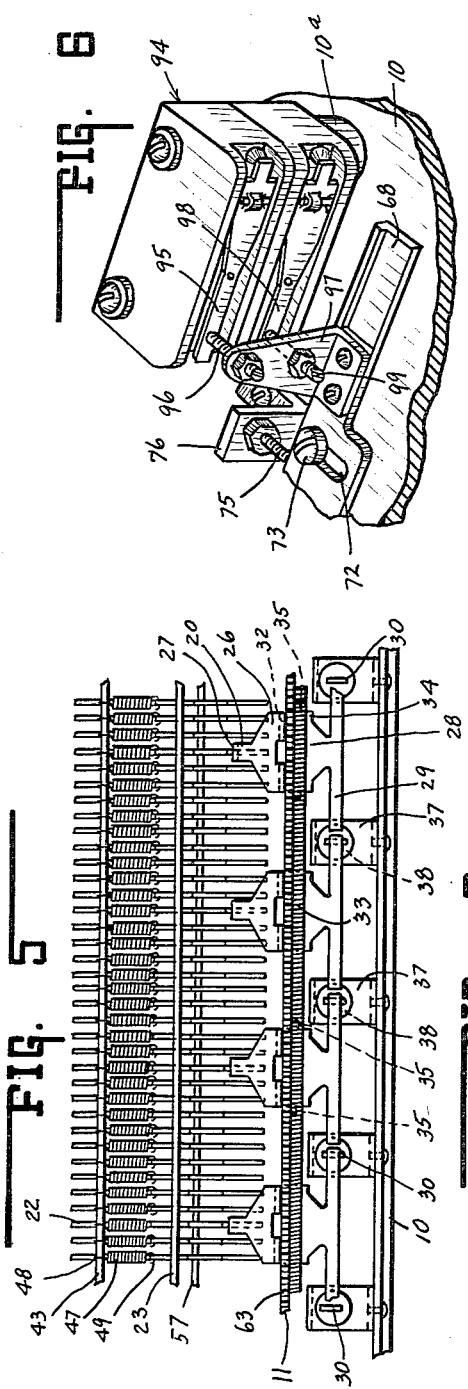
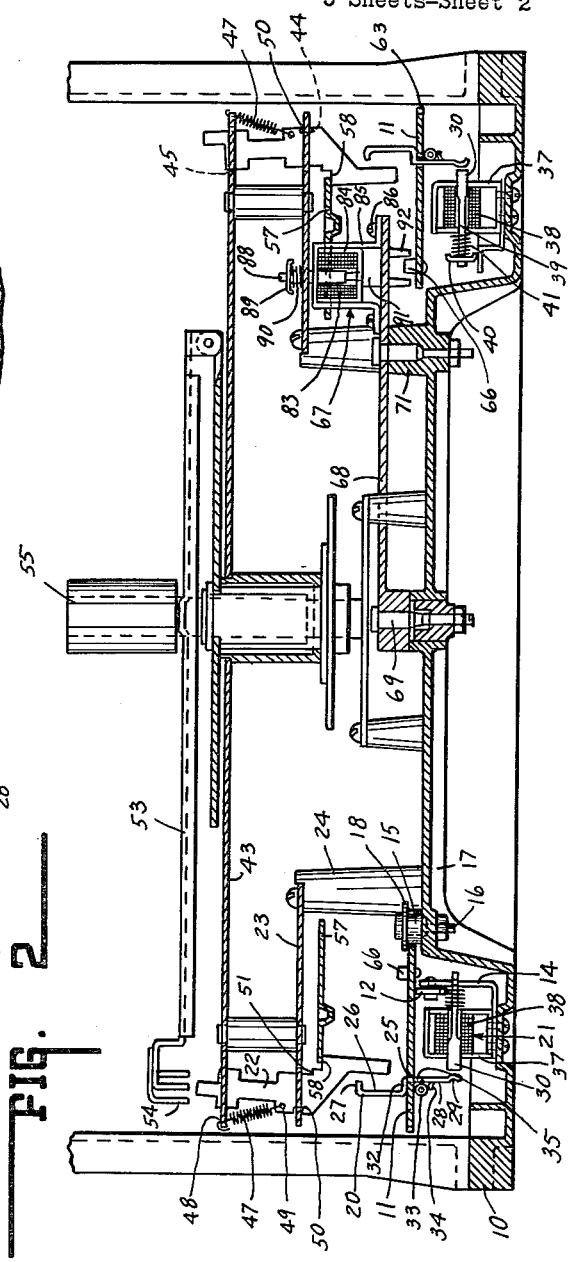
INVENTORS.
FRED H. OSBORNE.
ROBERT S. TUTTLE.
BY JOHN H. RIGGS.
Lockwood, Galt, Woodard & Smith
ATTORNEYS.

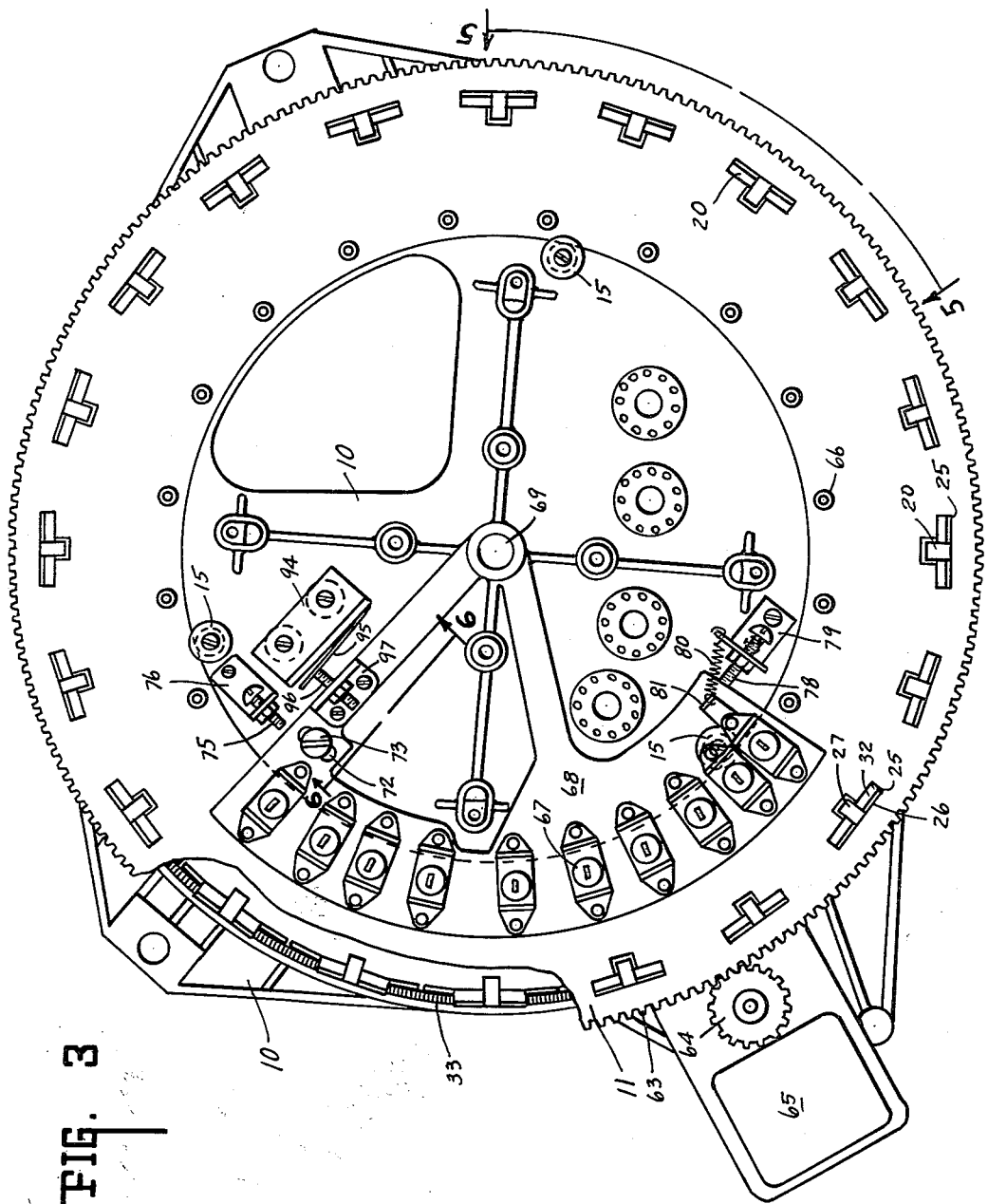

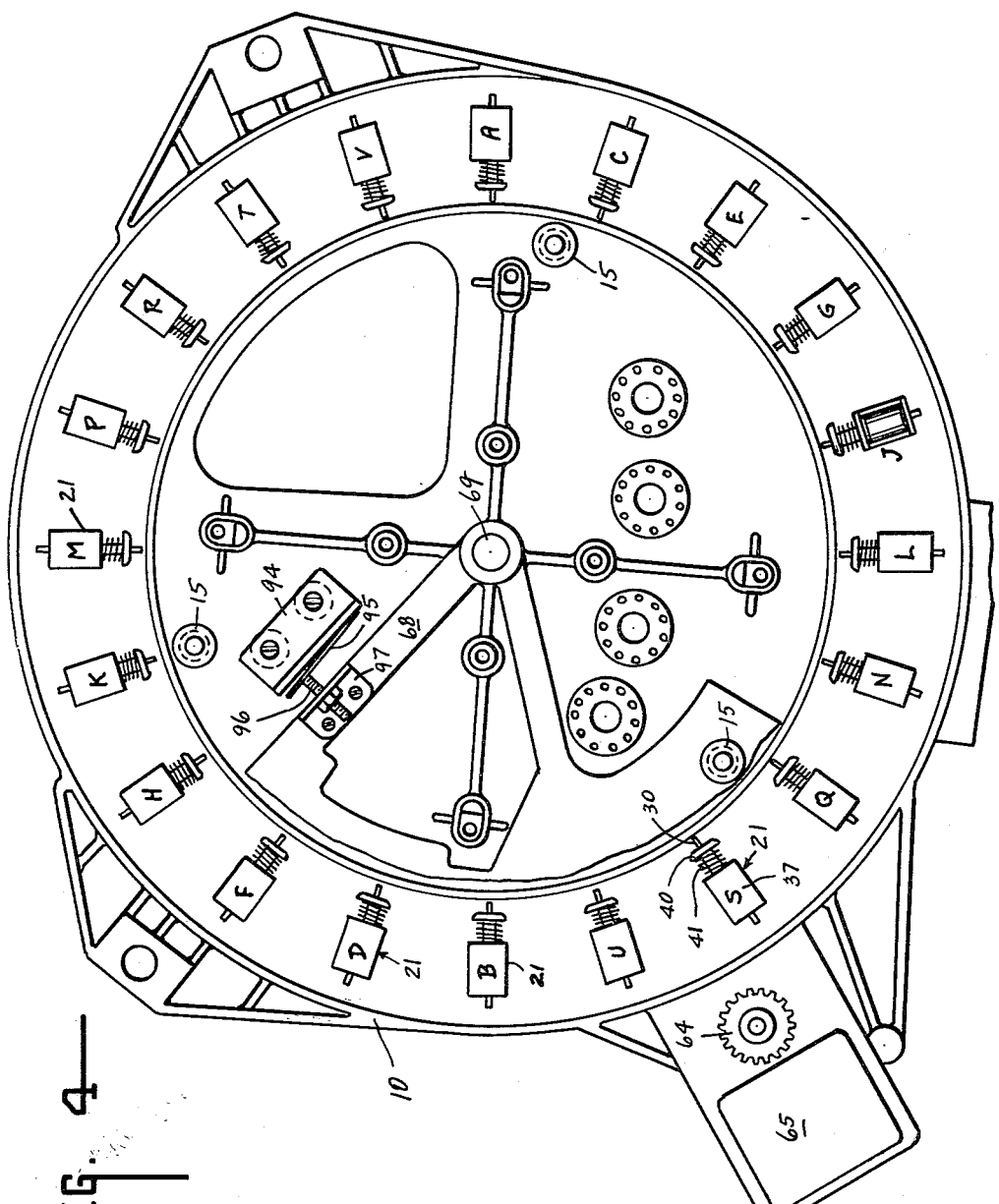

FIG. 7

INVENTORS.
FRED H. OSBORNE.
ROBERT S. TUTTLE.
BY JOHN H. RIGGS.

Lockwood, Galt, Woodard + Smith.
ATTORNEYS.

United States Patent Office 3,050,309
Patented Aug. 21, 1962

3,050,309
SELECTOR FOR AUTOMATIC PHONOGRAPHS
Fred H. Osborne, Snyder, Robert S. Tuttle, Eggertsville, and John H. Riggs, Kenmore, N.Y., assignors to The Wurlitzer Company, Chicago, Ill., a corporation
Filed Jan. 17, 1958, Ser. No. 709,530
9 Claims. (Cl. 274—10)

This invention relates generally to automatic phonograph apparatus and more particularly to a selector similar to that disclosed in the application for United States Letters Patent of John H. Riggs, Serial No. 571,221, filed March 18, 1956, now Patent No. 2,949,309 and adapted to control an automatic phonograph having a greatly increased number of stored records.

Selector apparatus of the type shown in the above identified application consists of an annular arrangement of selector pins, each of which may be released in response to operation of a button-operated switch forming a part of a coin-operated control mechanism. Each of the said pins functions to effect selection of a record from a group of records for playing one side or the other on a turntable. The selector disclosed in said application is adapted to cooperate with a phonograph having a record storing magazine capable of handling fifty-two records.

The apparatus as disclosed in said patent application comprises an annular array of solenoids actuated in response to number pulses. A plurality of pin selector members are movably positioned between the solenoids and the selector pins and are mounted on a rotatable disc which is rotated by a driver solenoid and stopped in selected positions in response to letter pulses.

When it became desirable to provide automatic phonographs having a greatly increased number of records, of the order of 100, the apparatus of said application was found to be unsuitable for controlling such phonographs. The rotating disc which supports the pin selector members would have excessive mass and it would be difficult to operate by means of a solenoid.

The use of letter impulse stop mechanisms would also be undesirable because of the force of impact created when a larger selector supporting disc is operated by the solenoid. The stop mechanisms of this type have also been found to be somewhat faulty in operation and quite noisy.

Accordingly the principal object of this invention is to provide a selector device for automatic phonographs which is adapted to cooperate with a phonograph capable of handling approximately 100 phonograph records making approximately 200 different record selections.

Another object of this invention is to provide a selector for automatic phonographs generally similar to that shown in the aforementioned patent application but having a driving mechanism which provides quiet, positive and foolproof operation.

In accordance with this invention, there is provided a selector for an automatic phonograph which comprises an annular series of selector pins corresponding in number to the number of musical selections or records in the phonograph magazine, a plurality of electromagnets adapted to release said pins into active selecting position in response to letter pulses, and means controllable by number pulses for mechanically associating each electromagnet with a plurality of said selector pins in succession, said means comprising a motor-driven mechanism which may be rotated progressively from one stop position to another under the control of number pulse solenoids, whereby each electromagnet may be effective to release one or more pins selected from a group of pins.

The full nature of the invention will be understood from the accompanying drawings and the following description and claims:

FIG. 2 is a cross section taken on line 2—2 of FIG. 1;

FIG. 3 is a top plan view of the selector illustrated in FIG. 1 with certain parts removed from the upper part of the mechanism;

FIG. 4 is a top plan view of the apparatus shown in FIG. 1 with enough parts removed to show the base plate of the apparatus together with the annular array of solenoids disposed thereon;

FIG. 5 is a partial side elevation of FIG. 1;

FIG. 6 is a perspective view of the motor controlling switch mechanism; and

FIG. 7 is a circuit diagram illustrating a control circuit for the selector.

Figure 1:
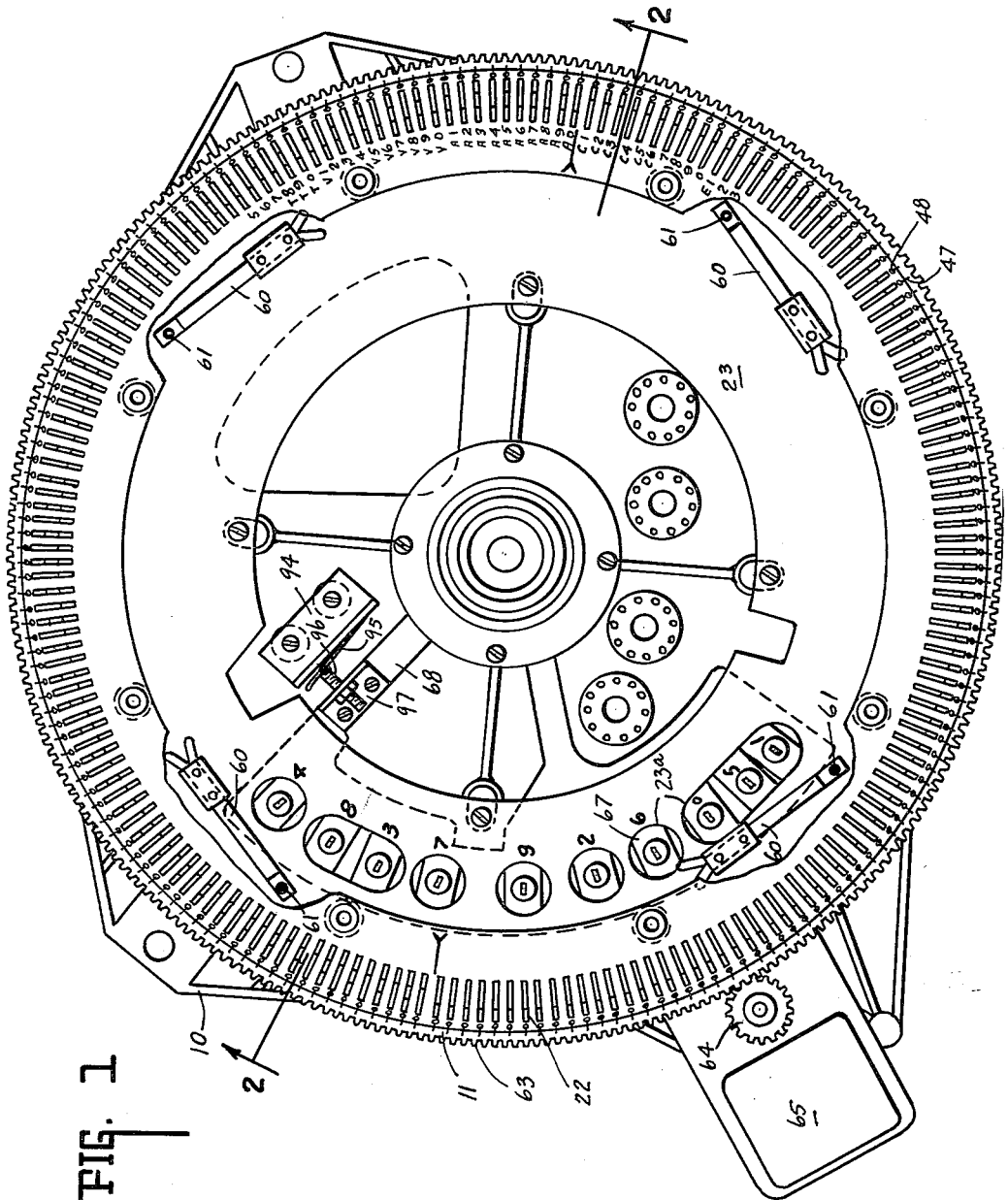
FIG. 1 is a top plan view of the record selector provided in accordance with this invention.

Referring to the drawings, the record selector mechanism provided in accordance with this invention comprises a base plate 10 on the upper side of which is mounted a rotatable selector plate or carrier 11. A plurality of rollers 12 are supported on brackets 14 attached to the base plate as shown in FIG. 2 for engaging the underside of and rotatably supporting the plate 11. A plurality of centering rollers 15 (FIGS. 2 and 3) are mounted on suitable bearing bolts 16 which are fastened to the raised center portion 17 of base plate 10. The rollers 15 engage the inner edge of plate 11 for causing it to rotate about a center, and are provided with flanges 18 which overhang plate 11 thereby to prevent upward movement thereof.

A plurality of pin-setting rockers or actuators 20 are pivotally supported in plate 11 for operation by associated solenoids 21, supported on base plate 10, thereby to associate solenoids 21 mechanically with the selector pins 22 movably mounted in an annular plate 23, supported on upright columns 24 integrally formed with base 10. The pin selecting rockers 20 are mounted in slots 25 disposed within the periphery of the selector plate 11 as illustrated in FIGS. 2 and 3. Each rocker comprises an upper portion 26 having a horizontally projecting finger or member 27 movable into engagement with a selected pin 22. Each rocker also includes a downwardly projecting member 28 located below the selector plate 11 and including an elongated laterally extending member 29 located in the plane of the plungers 30 of solenoids 21. Thus it is arranged that a solenoid 21 may move its plunger into contact with member 29 to operate any one of ten selector pins 22. Portions 26 and 28 of the rockers are connected by a horizontal portion 32 which rests on the upper surface of selector plate 11 and provides a pivot for the rocker. The rockers are maintained in operative position relative to plate 11 by means of a continuous coiled spring 33 tensioned into engagement with the members 28 and confined between plate 11 and turned-out ears 34 on each rocker 20. Each member 28 is provided with ear portions 35 which bear on the lower surface of plate 11 preventing upward movement of the rockers, the horizontal connecting member 32 preventing downward movement of the rockers. Therefore the rockers can have only a pivotal motion occurring when the solenoid plungers move outwardly to pivot the rockers against the restraining action of spring 33.

Each solenoid 21 comprises a rectangular frame member 37 supporting a coil 38 and a slidably movable plunger 30. Each plunger 30 has a rearwardly extending portion 39 supporting a cup member 40 which confines a coil spring 41 whereby each plunger is held in the position illustrated in FIG. 2 except when the solenoid is energized to move the plunger outwardly to engage and pivot rocker 20, spring 41 serving to return the plunger to idle position when the solenoid is deenergized.

The pins 22 are supported by plate 23 together with an upper annular plate 43, both plates having perpendicularly aligned slots 44 and 45 respectively within which the pins are moved upwardly and downwardly. Springs 47 are hooked in holes 48 adjacent the outer periphery of plate 43 and connected under tension with the midportion of pin 22 as at 49. Each pin is notched at 50 whereby the angular relation of spring 47 to pin 22 normally tends to engage the notched portion of the pin with the outer end of the slot 44 in plate 23 whereby the pin cannot move upwardly until rocker 26 pushes the lower end of the pin inwardly to disengage notch 50 from plate 23 whereupon pin 22 is drawn upwardly and engages a stop surface 51 with the lower surface of plate 23. In this position pin 22 is in the path of movement of a selector arm 53 having downwardly projecting teeth 54 adapted to engage the upper ends of pins 22 as arm 53 rotates about the shaft 55. This shaft is mechanically connected with the record supporting mechanism whereby the rotation of the magazine is stopped during the selection cycle when one of the teeth 54 engages the upper end of a pin 22.

A wobble ring 57 rests on the shoulder 58 formed on the inner edge of each pin 22 whereby any upward movement of one of the pins 22 moves wobble ring 57 upwardly. Control switches 60 (FIG. 1) are mounted on plate 23 and include switch operating members 61 which rest on wobble plate 57. Switches 60 are constructed and arranged so that whenever any one of the pins 22 is elevated, at least one of the members 61 is moved upwardly by plate 57 to operate its associated switch 60 for a purpose which will subsequently be described.

The rotatable selector plate 11 is provided with gear teeth 63 which mesh with the pinion 64 driven by an electric motor 65 whereby plate 11 and the rocker arms 20 supported thereon may be rotated relative to the solenoids 21 and the pins 22. For stopping plate 11 in a position to effect selection of a given pin 22 which represents a particular record selection, a plurality of stop pins 66 (FIGS. 2 and 3) are mounted on plate 11 adjacent its inner periphery. Stop pins 66 are spaced from one another a distance equivalent to the spacing between ten of the pins 22. A plurality of stop solenoids 67 are mounted on a segment 68 which is supported for a slight degree of rotation on a centrally disposed shaft 69. Segment 68 rests at its outer extremities on bosses 71 formed integrally with base 10. The slots 72 (FIG. 3) in segment 68 accommodate stop screws 73 which are threaded into the bosses 71. A first adjustable stop screw 75 is mounted on base 10 by means of a bracket 76 thereby to limit clockwise movement (FIG. 3) of segment 68. A second adjustable stop screw 78 is mounted in bracket 79 adjacent the other end of segment 68 for limiting counterclockwise movement of segment 68. A spring 80 is connected between bracket 79 and a lug 81 attached to segment 68 for normally holding segment 68 in engagement with stop screw 78.

Each of the solenoids 67 comprises a coil 83 mounted in a cylindrical cup member 84 which in turn is mounted on a U-shaped bracket 85 attached by screws 86 to segment 68. Each solenoid includes a plunger 88, projecting upwardly through holes 23a in plate 23, and having a cap member 89 which confines a coil spring 90 for normally holding the plunger in an uppermost position. The opposite end of each plunger comprises an enlarged stop plate 91 movable downwardly below segment 68 into the path of movement of the stop pins 66 on plate 11. Segment 68 includes downwardly projecting lugs 92 in back-up relation to plate 91 whereby the impact of stop pin 66 on plate 91 may be absorbed by the lugs.

There are ten of the number solenoids 67 mounted at different intervals on segment 68, each solenoid being operated by a number pulse and each solenoid being so positioned that it will always stop the plate 11 with the finger 27 of a rocker 26 in alignment with a pin 22 corresponding to that number.

In order to stop the segment 68 from rotating more than a few degrees when one of the number solenoids is operated and at the same time in order to stop the plate 11, there is provided a motor control switching device 94 mounted on suitable upright columns 10a integrally formed with base 10. This includes two so-called microswitches, one of which has an operating switch member 95 in alignment with and operated by an adjustable screw 96 mounted in bracket 97 which in turn is mounted on segment 68. The second microswitch includes a switch contact 98 adapted to be engaged by a second adjustable screw 99 also mounted in bracket 97. Switch 95 is connected in the circuit of motor 65 to stop that motor when segment 68 is in engagement with stop screw 75 at which time spring 80 has been tensioned. When motor 65 is stopped, the second switch is operated to reverse the motor for an instant thereby moving segment 68 back to its original position in engagement with stop pin 78. Meanwhile one of the number solenoids 67 will have been operated and will have stopped the plate 11 as will be described in more detail.

FIG. 7 illustrates one type of control circuit which may be utilized for operating the mechanism illustrated in FIGS. 1 to 5. A switch 110, operated in response to insertion of a coin in a coin-operated phonograph, may be connected from ground to a first transfer relay 111 through contacts 113 to battery 114. A latch solenoid 115 may be connected from ground through a current-limiting resistor 116 and contacts 117 of relay 111 to battery 114. When relay 111 is energized, its holding circuit through contacts 112 is closed and the contacts 117 close to energize latch solenoid 115 through its normally closed contacts 118 connected in parallel with resistor 116. Contacts 118 will open but current flow through resistor 116 holds latch solenoid 115 energized.

When latch solenoid 115 is energized it closes its normally open contacts 119 to prepare a circuit through the manually operated letter switches 122 and selector letter solenoids 21 which are connected in series with a pair of contacts 129 of a second transfer relay 123. Latch solenoid 115 unlocks a number latch switch 120 and a letter latch switch 121. The mechanical relationship of latch solenoid 115 to the letter and number latch switches is not shown since such arrangements are conventional in the art.

The letter switches 122 are also connected in series with a pair of normally open contacts 124 of the pulse relay 125. Switches 122 serve to complete circuits through the selector solenoids 21 so that after a coin is inserted in the automatic phonograph, the letter switches may be closed to energize selector solenoids 21 corresponding to a record to be selected.

A plurality of manually operated number switches 126 are connected from ground through contacts 127 of transfer relay 111 through the latch switches 120 and 121 and are arranged to complete circuits through the selector member solenoids 67 to the second transfer relay 123 and battery 114. Thus the letter switches and number switches may be closed preparatory to effecting a record selection. When any one of the number switches 126 is closed, relay 123 is energized. Its normally open contacts 129 are immediately closed thereby to further prepare the circuit of the letter solenoids.

Relay 123 also includes a pair of normally open contacts 130 connected in series with a thermostatic switch 128, which is grounded, through the normally closed motor starting switch 95 and the forward winding 135 of motor 65 to 24-volt line 133. This causes the rotatable selector plate 11 to start its rotation. The selector plate 11 rotates until one of the stop pins 66 engages a stop plate 91 of the selected number solenoid 67. At this time an adjustable screw 96 engages the switch 95, moving it to the normally open contact to energize the transfer relay 131 from ground through thermostat switch 128, contacts 130, switch 95 and previously closed contacts 132 of transfer relay 123 to battery 114. The motor 65 and the segment 68 is held against the forward stop by the circuit from ground through thermostat 128, contacts 130 and contacts 137 connected in series with the forward motor winding 135 and closed by transfer relay 131.

The pulse relay 125 is connected from battery 114 in series through a pair of normally open contacts 134 of relay 131 to ground through the latch switches 120, 121 and contacts 127 of relay 111. This circuit is closed when relay 131 is energized. The contacts 124 are closed when pulse relay 125 is energized and the contacts 129 of relay 123 were closed when that relay was energized, thereby to complete a circuit from ground through contacts 129, letter solenoids 21, letter switches 122, contacts 119 of relay 115 and contacts 124 of relay 125 to alternating current line 133. Thus the selector letter solenoids 21 are energized to release a selected pin 22.

When pulse relay 125 was energized its contacts 113 opened, thereby opening the circuit to relay 111. This relay remains operated for a short interval because it has a copper slug and this provides a time interval within which the letter solenoids 21 may operate. After a short time interval, relay 111 drops its contacts whereby contacts 112 open to break the holding circuit and contacts 117 open to break the circuit to latch solenoid 115. This causes the number and letter latch switches 120 and 121 to open thereby de-energizing the coils 67 and opening the letter and latch switches. This causes relay 123 to drop its contacts at which time its contacts 136 close. These contacts prepare a motor reversing circuit which includes thermostat 128, reversing switch 98, contacts 138 of relay 131, and the reversing winding 139 of motor 65. When relay 123 drops its contacts, contacts 132 open de-energizing relay 131, thereby causing its contact 138 to close to complete the reversing circuit through motor winding 139. The reverse action of the motor returns the segment 68 to its rest position opening the reversing switch 98 and the start switch 95 thereby stopping the selector plate 11 and its driving motor 65.

In operation, the selector apparatus disclosed herein cooperates with an automatic phonograph such as that shown in the application for Letters Patent Serial No. 388,242, filed October 26, 1953, for Automatic Phonograph. As explained in said application, selector pins, such as the pins 22, serve to stop rotation of the selector arm 53 fixed to a rotating shaft 55 which controls the positioning of the record magazine, as shown in said patent application, thereby to position a selected record or a selected side of a record for playing. It should be noted that the selector apparatus provided herein may be utilized for the purpose of selecting a certain record after which a double stylus pick-up may move into playing contact with either side of said record. The selector apparatus may also be utilized as disclosed in said application as a means of presenting a selected side of a record to a single stylus for playing.

Operation of the selector apparatus may be initiated when the key switch 110 is operated directly or indirectly in response to insertion of a coin or coins in an automatic phonograph. This energizes relay 111, closing normally open contacts 117 to energize latch solenoid 115 and close contacts 119 to prepare the circuit through the letter switches 122.

When the latch solenoid 115 is energized it operates auxiliary apparatus which unlocks the letter and number switches 122 and 126, respectively. These switches are normally mechanically locked against operation, thereby to prevent operation of the switches until after a coin is inserted in the phonograph.

When one of the number switches 126 is closed and one of the letter switches 122 is closed by pushing number and letter buttons, the latch switches 120 and 121 are operated by suitable mechanical linkages into closed position. These switches complete a circuit from ground through contacts 127 or relay 111 through the selected number coils 67 and relay 123 to battery 114. Relay 123 energizes closing contacts 130 completing a circuit through the forward winding 135 of motor 65 thereby starting the motor.

Motor 65 drives the selector plate 11 and stop pins 66 move therewith. Assuming that an A button switch has been operated and number switch 9 has also been operated, the stop solenoid 67 bearing the number 9 will have been energized, moving its plunger 88 and stop plate 91 into the path of movement of a stop pin. Since the stop solenoid bearing the number 9 is positioned always to stop the selector plate 11 with the pin selecting rockers 20 in alignment with those selector pins associated with the number 9, the selector is set for operation of one of the solenoids 21 depending upon which of the letter buttons has been operated.

When one of the stop pins 66 engages the stop plate 91, there is driving engagement between selector plate 11 and segment 68 which moves segment 68 a few degrees in a clockwise direction (FIG. 3). During these few degrees of movement, the screw 96 will engage and open the switch 95 thereby to de-energize motor 65. When switch 95 is operated, its normally open contact closes to energize relay 131 through switch 128, contacts 130 of relay 123, the coil of relay 131, and contacts 132 of relay 123 to battery 114. Contacts 137 of relay 131 close to shunt switch 95 and hold the forward winding 132 of motor 65 energized. Thus segment 68 is held in its extreme forward position.

When relay 131 was energized it closed contacts 134 completing a circuit through the pulse relay 125. This causes contacts 124 of relay 125 to close, completing a circuit from the alternating current line 133 through contacts 119, letter switches 122, the selected letter coil 21, contacts 129 and ground. Since the letter button A has been depressed, the solenoid 21 corresponding to the letter A will be energized.

The modification of the invention disclosed herein includes twenty letter solenoids 21. The arms 29 of each rocker 20 span ten of the selector pins 22. As will be noted in FIG. 1 of the drawings, some of the selector pins 22 have been labeled A1–A0 and V1–V0. Similarly all of the selector pins 22 may be associated with identifying symbols including a letter of the alphabet and a numeral between 1 and 10. The stop solenoids 67 also bear number identifications from 1 to 10 identifying the particular stop solenoids which are effective to stop the selector plate 11 in the proper position for one of the letter solenoids 21 to effect selection of a particular selector pin.

It has been assumed that the letter button A and the number button 9 have been punched. Therefore the A solenoid (FIG. 4) will have been energized when contacts 119 and 124 were closed. The stop solenoid 67 corresponding to the number 9 will have stopped the plate 11 with the rocker finger 27 in alignment with the selector pin 22 which corresponds with the number 9 in the A group. When the finger 27 engages the selector pin and moves it toward the right (FIG. 2) notch 50 will disengage from plate 23 and spring 47 will pull the selector pin upwardly from its stop surface 51 in engagement with the lower surface of plate 23. When the pin 22 moves upwardly, its shoulder 58 engages and lifts the wobble ring 57. This will cause upward movement of at least one of the members 61 which will close its associated switch 60. This effects closure of the circuit energizing the phonograph drive motor (not shown) and will initiate rotation of the shaft 55 and the selector arm 53, which rotation continues until arm 53 is stopped by that selector pin 22 which has risen to elevated position. Since the shaft 55 controls rotation of a record magazine, a selected record or side of a record will have been presented for playing by the phonograph pick-up.

When pulse relay 125 was energized the contacts 113 thereof opened thereby opening the circuit of relay 111. However, this relay holds its contacts closed momentarily because this relay is provided with copper slugs. After a predetermined interval, contacts 112 open breaking the holding circuit of relay 111. Contacts 117 will open thereby to de-energize latch solenoid 115. This causes the number and letter latch switches 120 and 121 to open, releasing the letter and number solenoids 21 and 67 respectively, de-energizing relay 123. This causes contacts 136 of this relay to close, preparing a circuit to the reversing winding 139 of motor 65. Contacts 132 of relay 123 open, de-energizing relay 131, thereby causing contacts 138 to close and complete a circuit through the reversing winding 139 of relay 65. It will be understood that when switch 95 was operated, screw 99 engaged the reversing switch 98 to close said switch. Motor 65, by its reverse action, returns the segment 68 to its rest position opening the reverse winding circuit and returning the motor starting switch 95 to its original closed contact. Thus the circuit is restored to its starting condition and the switch 110 may again be operated in response to insertion of a coin in the coin box of the phonograph.

From the foregoing description, it will be apparent that this invention provides a selector device wherein the plate which supports the rocker arms is always rotated in the same direction to make each individual selection. No matter where the plate may have stopped in making the previous selection, it is always prepared for movement in the same direction for making the following selection. It should also be noted that this invention makes possible the selection of a single recording from a very large number of records, only a relatively few solenoids being required.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A selector apparatus adapted to cooperate with an automatic phonograph having a mechanism for selecting and presenting a record for playing and having a first series and a second series of manually operable switches, comprising an annular array of spaced selector pins normally resting in idle positions and movable into positions to cooperate with said mechanism to control its operation for presenting a selected record for playing, a wheel rotatably mounted coaxially of said pins, a plurality of pin selector means mounted on said wheel in operative relation to said pins, means operatively associated with said selector means and operable in response to operation of switches of said first series for operating said respective pin selector means, means for rotating said wheel progressively from one pin selecting position to another, a plurality of stops disposed in annular array on said wheel, a segmental supporting member pivotally mounted over said stops, a plurality of stop spaced solenoids mounted on said segmental supporting member and having their plungers disposed for movement into the path of movement of said stops, each stop solenoid being positioned to stop said wheel with each selector means in operative association with a selector pin representative of a given switch of said second series, stop means spaced from each end of said segmental supporting member to limit its pivotal movement, and switch means adjacent one end of said segmented supporting member and operatively associated with said wheel rotating means, said switch means including switch members engageable by said segmental supporting member for de-energizing said wheel rotating means and momentarily reversing said wheel rotating means for disengaging said plungers from said stops.

2. A selector apparatus adapted to cooperate with an automatic phonograph having a mechanism for selecting and presenting a record for playing and having a first series and a second series of manually operable switches, comprising an annular array of spaced selector pins normally resting in idle positions and movable into positions to cooperate with said mechanism to control its operation for presenting a selected record for playing, a wheel rotatably mounted coaxially of said pins, a plurality of pin selector means mounted on said wheel in operative relation to said pins, means operatively associated with said selector means and operable in response to operation of switches of said first series for operating said respective pin selector means, means for rotating said wheel progressively from one pin selecting position to another, a plurality of stops disposed on said wheel, a supporting member movably mounted over said stops, a plurality of spaced electrically operated stop devices mounted on said supporting member and having means disposed for movement into the path of movement of said stops, each stop device being positioned to stop said wheel with each of said selector means in operative association with a selector pin representative of a given switch of said second series, stop means spaced from each end of said supporting member to limit its movement, and switch means adjacent one end of said supporting member and operatively associated with said wheel rotating means and said supporting member for de-energizing said wheel rotating means and momentarily reversing said wheel rotating means for disengaging said stop device means from said stops.

3. A selector apparatus adapted to cooperate with an automatic phonograph having a mechanism for selecting and presenting a record for playing and having a first series and a second series of manually operable switches, comprising an annular array of spaced selector pins normally resting in idle positions and movable into positions to cooperate with said mechanism to control its operation for presenting a selected record for playing, a wheel rotatably mounted coaxially of said pins, a plurality of pin selector means mounted on said wheel in operative relation to said pins, means operatively associated with said selector means and operable in response to operation of switches of said first series for operating said respective pin selector means, means for rotating said wheel progressively from one pin selecting position to another, a plurality of stops disposed in annular array on said wheel, a supporting member movably mounted over said stops, a plurality of stop devices mounted on said supporting member and having means disposed for movement into the path of movement of said stops, each stop device being positioned to stop said wheel with each pin selector means in operative association with a selector pin representative of a given switch of said second series, and means operatively associated with said wheel rotating means and said supporting member for stopping said wheel rotating means and momentarily reversing said wheel rotating means for disengaging said stop device means from said stops.

4. In a phonograph selector apparatus, the combination of an annular series of settable record selector elements, a rotatable carrier supported for unlimited rotation in concentric relation to said series of selector elements, a rotary electric motor connected to drive said carrier rotatably to an unlimited rotary extent about the axis thereof; an annular series of stationary selector element setting solenoids positioned in generally concentric relation to said series of selector elements so that said solenoids are circumferentially alined with corresponding groups of said selector elements, each of which groups comprises a number of selector elements equal to a relatively large sub-multiple of the total number of selector elements; a plurality of selector element setting actuators supported by said carrier in an annular series and corresponding in number to said solenoids, each of said actuators including a selector element setting member operable to set a single selector element alined therewith upon operation of the actuator, said actuators and said solenoids including means for maintaining for all rotary positions of said carrier about the axis thereof an operative relationship between each actuator and the solenoid corresponding to the group of selector elements which includes the selector element with which the selector element setting portion of the actuator is alined, an annular series of abutments on said carrier, a plurality of stop solenoids mounted in coacting relation to said abutments and corresponding in number to the number of selector elements in each of said groups, a first series of manual controls for operating said respective selector element setting solenoids, a second series of manual controls for operating said respective stop solenoids, circuit means responsive to operation of a control in each of said series of controls to energize said motor to rotate said carrier and said actuators in a predetermined normal direction, said stop solenoids including plungers coacting with said abutments to terminate rotation of said carrier in differentially spaced positions, a switch responsive to the reaction of any of the said abutments on any of said stop solenoids, circuit means controlled by operation of said switch and coacting with said selector element setting solenoids to effect operation of one of the latter corresponding to the operated control in said first series of controls, and circuit means coacting with said motor and responsive to operation of said switch to effect rotation of said carrier in a reverse direction through an angle equal to only a fraction of the radial spacing between adjacent ones of said selector element setting solenoids.

5. In a phonograph selector apparatus, the combination of an annular series of settable record selector elements, a rotatable carrier supported for unlimted rotation in concentric relation to said series of selector elements, a rotary electric motor connected to drive said carrier rotatably to an unlimited rotary extent about the axis thereof; an annular series of electrically operated selector element setting devices supported on said carrier and being equal in number to a submultiple of the number of selector elements, each of said setting devices including a selector element setting member operable to set a single selector element alined therewith, an annular series of abutments on said carrier, a plurality of differential stop solenoids mounted in coacting relation to said abutments, a first series of manual controls for said respective selector element setting devices, a second series of manual controls for said respective stop solenoids, circuit means responsive to operation of a control in each of said series to energize said motor to rotate said carrier and said setting devices in a predetermined normal direction, said stop solenoids including plunger means cooperable with said abutments upon selective energization of the stop solenoids to terminate rotation of said carrier in differentially spaced positions, a switch responsive to the reaction of any of the said abutments on any of said stop solenoids, circuit means controlled by operation of said switch and coacting with said selector element setting devices to effect operation of one of the latter corresponding to the operated control in said first series of controls, and circuit means coacting with said motor and responsive to operation of said switch to effect rotation of said carrier in a reverse direction through an angle equal to only a fraction of the radial spacing between adjacent ones of said selector element setting solenoids.

6. In a phonograph selector apparatus, the combination of an annular series of settable record selector elements, a rotatable carrier supported for unlimited rotation in concentric relation to said series of selector elements, a rotary electric motor connected to said carrier to effect unlimited rotation thereof, an annular series of electrically operated selector element setting devices supported on said carrier, each of said setting devices including a selector element setting member operable to set a single selector element alined therewith, an annular series of abutments on said carrier, a plurality of differential stop solenoids mounted in coacting relation to said abutments, a first series of manual controls for said respective selector element setting devices, a second series of manual controls for said respective stop solenoids, circuit means responsive to operation of a control in each of said series to energize said motor to rotate said carrier in a predetermined normal direction, said stop solenoids including plunger means cooperable with said abutments upon selective energization of the stop solenoids to terminate rotation of said carrier in differentially spaced positions, said circuit means including a circuit network controlling said stop solenoids to effect upon operation of a control in each of said series energization of the stop solenoid which corresponds to the operated one of the controls of said second series, and said circuit means including a circuit network connected in controlling relation to said setting devices and being mechanically related to said carrier to respond to stopping of rotation of the carrier to effect operation of a setting device corresponding to an operated one of said controls in said first series.

7. In phonograph record selector apparatus, the combination of an annular series of settable record selector elements, a rotatable carrier supported for unlimited rotation in concentric relation to said series of selector elements, a rotary electric motor connected to said carrier to drive the latter rotatably to an unlimited rotary extent around the axis thereof, an annular series of electrically operated selector element setting devices supported on said carrier, each of said setting devices including means for setting a single selector element with which the setting device is alined by the rotary position of the carrier, an annular series of carrier stop abutments for terminating rotation of the carrier by said motor, a plurality of differential stop solenoids each controlling a stop element normally disposed out of interfering relation to said abutments, each stop solenoid being operable upon energization thereof to extend the coacting stop element into interfering relation to said abutments to coact therewith to effect stoppage of rotation of said carrier, movable support means supporting said stop solenoids and said stop elements thereof for limited displacement by the reaction of an abutment on a stop element, a first series of switches for controlling said respective selector element setting devices, a second series of switches for controlling said respective stop solenoids, circuit means responsive to operation of a switch in each of said series to energize a stop solenoid corresponding to the operated switch in said second series and coacting with said motor to effect rotation of said carrier in a predetermined normal direction, switch means responsive to displacement of said support means for said stop solenoids, and said circuit means including means responsive to said switch means to effect operation of a selector element setting device corresponding to an operated one of the switches of said first series and coacting with said motor to effect deenergization thereof.

8. In phonograph record selector apparatus, the combination of an annular series of settable record selector elements, a rotatable carrier supported for unlimited rotation in concentric relation to said series of selector elements, a rotary electric motor connected to said carrier to drive the latter rotatably to an unlimited rotary extent around the axis thereof, an annular series of electrically operated selector element setting devices supported on said carrier, each of said setting devices including means for setting a single selector element with which the setting device is alined by the rotary position of the carrier, a first series of carrier stop elements for terminating rotation of the carrier by said motor, said first series of stop elements being disposed in an annular array and being rotatable with said carrier, a second series of stop elements normally disposed out of interfering relation to said first series of stop elements, a plurality of stop solenoids coacting with said respective stop elements of said second series to move the latter selectively into interfering relation to the stop elements of said first series to effect differential stoppage of rotation of said carrier, movable means providing for limited displacement of the stop elements of one of said series in relation to support structure therefor by the reaction between stop elements of both series incident to stopping said carrier, a first series of switches for controlling said selector element setting devices, a second series of switches for controlling said respective stop solenoids, circuit means responsive to operation of a switch in each of said series of switches to energize a stop solenoid corresponding to the operated switch in said second series of switches and coacting with said motor to effect rotation of said carrier in a predetermined normal direction, switch means responsive to displacement of said movable means, said circuit means including means responsive to said switch means to effect operation of a selector element setting device corresponding to an operated one of the switches of said first series of switches, and said circuit means including network means coacting with said motor to effect in timed relation to operation of a selector element a subsequent reversal of said motor to rotate said carrier in a reverse direction through an angle which is only a small fraction of the radial angle between successive stop elements of said first series.

9. In a phonograph record selector, the combination of an annular series of settable record selector elements, a rotatable carrier supported for unlimited rotation in concentric relation to said series of selector elements, a rotary electric motor connected to drive said carrier rotatably about the axis thereof to an unlimited rotary extent, an annular series of electrically operated selector element setting devices supported on said carrier, each of said setting devices including means for setting a selector element with which alinement of the setting device is determined by the instantaneous rotary position of the carrier, a plurality of carrier stop abutments, a plurality of differential stop solenoids equal to a relatively large submultiple of the total number of settable selector elements, each of said stop solenoids including a stop element normally disposed out of interfering relation to said abutments and being extendable into interfering relation with said abutment upon energization of the stop solenoid to effect stoppage of rotary movement of said carrier by said rotary electric motor, a first series of manual selector switches for controlling operation of said respective differential stop solenoids, and a second series of manual selector switches for controlling operation of said respective selector element setting devices.

References Cited in the file of this patent
UNITED STATES PATENTS

| | | |
|---|---|---|
| 2,382,487 | Kenney et al. | Aug. 14, 1945 |
| 2,416,436 | Eakins | Feb. 25, 1947 |
| 2,621,241 | Jensen | Dec. 9, 1952 |
| 2,631,856 | Osborne | Mar. 17, 1953 |
| 2,850,285 | Vanderzee | Sept. 2, 1958 |
| 2,865,638 | Acker | Dec. 23, 1958 |
| 2,949,309 | Riggs | Aug. 16, 1960 |